(12) United States Patent
Wilson

(10) Patent No.: US 8,204,630 B2
(45) Date of Patent: Jun. 19, 2012

(54) MODULAR SPRINKLER CONTROLLER

(75) Inventor: Chadwick L. Wilson, Woods Cross, UT (US)

(73) Assignee: Orbit Irrigation Products, Inc., North Salt Lake, UT (US)

( * ) Notice: Subject to any disclaimer, the term of this patent is extended or adjusted under 35 U.S.C. 154(b) by 250 days.

(21) Appl. No.: 12/569,687

(22) Filed: Sep. 29, 2009

(65) Prior Publication Data

US 2010/0082170 A1 Apr. 1, 2010

Related U.S. Application Data

(60) Provisional application No. 61/100,991, filed on Sep. 29, 2008.

(51) Int. Cl.
G05D 11/00 (2006.01)

(52) U.S. Cl. ...................................................... 700/284

(58) Field of Classification Search .................. 700/284
See application file for complete search history.

(56) References Cited

U.S. PATENT DOCUMENTS

| | | | |
|---|---|---|---|
| 3,869,854 A | 3/1975 | Church | |
| 4,090,764 A | 5/1978 | Malsby et al. | |
| 4,152,750 A | 5/1979 | Bremenour et al. | |
| 4,242,721 A | 12/1980 | Krolak et al. | |
| 4,569,020 A | 2/1986 | Snoddy et al. | |
| 4,672,510 A | 6/1987 | Castner | |
| 4,852,051 A | 7/1989 | Mylne, III | |
| 4,922,407 A | 5/1990 | Birk et al. | |
| 4,937,732 A | 6/1990 | Brundisini | |
| 5,101,083 A | 3/1992 | Tyler et al. | |
| 5,262,936 A * | 11/1993 | Faris et al. | 700/11 |
| 5,265,005 A | 11/1993 | Schmidt et al. | |
| 5,272,620 A | 12/1993 | Mock et al. | |
| 5,278,749 A | 1/1994 | De Man | |
| 5,293,554 A | 3/1994 | Nicholson | |
| 5,381,331 A | 1/1995 | Mock et al. | |
| 5,410,717 A | 4/1995 | Floro | |
| 5,414,618 A | 5/1995 | Mock et al. | |
| 5,421,738 A | 6/1995 | Roberts | |
| 5,479,338 A | 12/1995 | Ericksen et al. | |
| 5,602,728 A | 2/1997 | Madden et al. | |
| 5,834,693 A | 11/1998 | Waddell et al. | |
| 5,956,248 A | 9/1999 | Williams et al. | |
| 6,256,191 B1 | 7/2001 | Curlee | |
| 6,459,959 B1 | 10/2002 | Williams et al. | |
| 6,772,050 B2 | 8/2004 | Williams et al. | |
| 6,996,457 B2 | 2/2006 | Williams et al. | |
| 2003/0208306 A1* | 11/2003 | Addink et al. | 700/284 |
| 2005/0267641 A1* | 12/2005 | Nickerson et al. | 700/284 |

(Continued)

OTHER PUBLICATIONS

Motorola, IrrInet Component Descriptions, Feb. 16, 1993.

(Continued)

*Primary Examiner* — Ronald Hartman, Jr.
(74) *Attorney, Agent, or Firm* — Austin Rapp & Hardman

(57) ABSTRACT

A modular sprinkler controller is disclosed. The modular sprinkler controller includes a base unit and one or more add-on modules. The base unit and each add-on module include valve terminals for communicating with coupled sprinkler valves. The base unit includes one or more communication connection points for communicating with adjacent add-on modules. Each add-on module may include two connection points for communication with an adjacent base unit or add-on module. In one embodiment, the base unit and add-on modules are arranged in a piggyback configuration. An add-on module for use with a base unit is also disclosed.

7 Claims, 4 Drawing Sheets

U.S. PATENT DOCUMENTS

2008/0140262 A1     6/2008     Williams et al.

OTHER PUBLICATIONS

Motorola, IrrInet—Trunked Radio Satellite Bidding Specifications, Dec. 14, 1992.
Motorola, Scorpio Bidding Specifications, Jan. 6, 1993.
Motorola, MIR5000C Quickstart, Feb. 1994.
Motorola, MIR5000 Reference Guide, Feb. 1994.
Motorola, Read Me First, Jan. 1990.
Motorola, MIR 5000C Software Installation, 1989, Technical Writing Services, Motorola Incorporated, Schaumburg IL.
Motorola, MIR 5000 System Troubleshooting Day 3 AM/PM Practicum, published at least by May 20, 2005.
Motorola, MIR 5000C System, Installation Section, 1989, Technical Writing Services, Motorola Communications Israel Ltd., Tel Aviv, Israel.
Motorola, Scorpion AC, Sep. 1994, Technical Writing Services, Motorola, Inc., Schaumburg, IL.
Motorola, Scorpion DC—Installation Instruction, Published at least by May 20, 2005.
Motorola, MIR5000C Central System Operation Instructions, 1991, Technical Writing Services, Motorola Communications Israel Ltd., Tel Aviv, Israel.
Toro/Motorola, System Concept, IrrInet, Published at least by May 20, 2005.
Motorola, IRRInet Owner's Manual, 1992, Motorola Communications Israel Ltd., Tel Aviv, Israel.
Motorola, IRRInet Owner's Manual, 1992, Motorola Communications.
Motorola, Scorpio Installation Instructions, 1993, Motorola Incorporated, Schaumburg IL.
Motorola, Irrinet General Description, 1993, Motorola Incorporated, Schaumburg IL.
Motorola, Irrinet CPU Module, 1992, Motorola Incorporated, Schaumburg IL.
Motorola, I/O Module 1992, Motorola Incorporated, Schaumburg IL.
The Strong Box, Stainless Steel Controller Encloser, 1991, V.I.T Products, Inc., San Diego, CA.
Rain Bird, Central Control System, Maxicom, 1994, Rain Bird Sales, Inc., Tucson, AZ.
Rain Bird, Maxicom Guide to Operations, 1993, Rain Bird Sales, Inc., Tucson, AZ.
Rain Bird, "Landscape Irrigation Products, 1993-1994 Catalog," 1993, Rain Bird.
Toro, Motorola MIR 5000 Radio-Based Irrigation Central Computer Control System, 1991, the Toro Company, Riverside, CA.
Motorola, MIR5000 Radio Linked Irrigation Control, System Planner, Mar. 8, 1993.
Motorola, Motorola MIR 5000 System Features, Nov. 1991.
Motorola, Motorola/ Toro MIR 5000F Radio Based Central Control System, 1991, San Diego Turf & Irrigation, San Diego, CA.
Motorola, Motorola MIR-5000 Component Descriptions, Feb. 16, 1993.
Motorola, MIR 5000F—Trunked Radio Satellite Bidding Specifications, Dec. 14, 1992.
Motorola, New Members to the MIR5000 Family Irrinet and Scorpio, Published at least by May 20, 2005.
Toro/Motorola, General Description—IRRInet, Published at least by May 20, 2005.
Office Action mailed May 20, 1996 for U.S. Appl. No. 08/312,268.
Office Action mailed Nov. 25, 1996 for U.S. Appl. No. 08/312,268.
Office Action mailed Aug. 24, 1998 for U.S. Appl. No. 08/904,125.
Office Action mailed Jan. 15, 2002 for U.S. Appl. No. 09/400,031.
Office Action mailed Dec. 3, 2003 for U.S. Appl. No. 10/198,849.
Office Action mailed Dec. 2, 2004 for U.S. Appl. No. 10/887,367.
Office Action mailed Jul. 19, 2005 for U.S. Appl. No. 10/887,367.
Office Action mailed Jul. 14, 2006 for U.S. Appl. No. 11/282,454.

* cited by examiner

MODULAR SPRINKLER CONTROLLER

RELATED APPLICATIONS

This application is related to and claims priority from U.S. Provisional Patent Application Ser. No. 61/100,991 filed on Sep. 29, 2008, for Modular Sprinkler Controller, with inventor Chadwick L. Wilson, which is incorporated herein by reference.

BACKGROUND OF THE INVENTION

Sprinkler controller modules enable a user to turn a number of sprinkler stations on and off from a single location. Sprinkler controller modules further enable a user to establish a schedule for turning on and off sprinkler stations in electrical communication with the module. Each sprinkler station generally includes a sprinkler valve, which is frequently a solenoid valve, that opens and closes in response to an electrical control signal from the sprinkler controller module. Opening a valve for a sprinkler controller station enables pressurized water to flow through the valve to sprinkler heads in fluid communication with the valve to provide water, or another fluid (such as water infused with fertilizer), to a specified region.

Unfortunately, a number of limitations exist in many sprinkler controller modules. For example, many of these modules are not expandable. As a result, if a user needs to control more sprinkler stations than are allowed by the present module, the user must discard the previously used sprinkler controller module and purchase an entirely new module that enables control of the desired number of sprinkler stations. It is, of course, time-consuming to replace the sprinkler controller module and wasteful to discard the previously used module.

Further, currently existing sprinkler controller modules may allow for add-on modules. However, these add-on modules or systems have certain limitations. For example, a base sprinkler controller module may allow only the addition of a single add-on module. In other cases, all of the electronic circuitry for controlling the additional sprinkler modules may be in the base unit, thus unnecessarily increasing the cost of the base unit.

Accordingly, there exists a need for an improved sprinkler controller module, which is disclosed below.

BRIEF SUMMARY OF THE INVENTION

A disclosed modular sprinkler controller includes a base unit and one or more add-on modules. The base unit includes a valve terminal for communicating with coupled sprinkler valves. The base unit also includes a microcontroller unit (MCU) and a triac group, which are in electrical communication with each other. The MCU receives input signals, such as user input, about when to turn coupled sprinklers on and off. The MCU may also receive the input from other devices, such as a rain or temperature sensor. The MCU, in conjunction with the triac group, transmits signals to turn coupled sprinkler valves on and off via the valve terminals.

Each base unit also includes one or more communication connection points for communicating with coupled add-on modules. The MCU may thus transmit and receive signals from coupled add-on modules.

Each add-on module includes an MCU, a triac group, valve terminals, and two communication connection points. The MCU and triac group may be utilized to transmit control signals to sprinkler valves coupled to the valve terminals of the add-on module based on signals received from the base unit. The MCU may thus transmit, receive, and interpret signals from a base unit, or even other add-on modules.

In one embodiment, the base unit and add-on modules have separate housings. Alternatively, a single housing may be utilized to shield the base unit and add-on modules from the elements. In one embodiment, a first add-on module is coupled to the base unit and a second add-on module is coupled to the first add-on module in a piggyback configuration.

It should also be noted that various types of serial communication may be utilized to communicate between the base unit and the add-on modules. For example, the I$^2$C communication protocol may be utilized to transmit signals between these devices. If the I$^2$C communication protocol is utilized, each communication connection point may include five communication channels. If other types of serial communication are utilized, a seven-channel communication block may be utilized.

The modular sprinkler controller thus enables the addition of valve terminals to a sprinkler controller without discarding the original controller. Also, the cost of the base unit is mitigated in that circuitry for controlling sprinkler valves is coupled to the add-on module, and is housed within the add-on module, not the base unit.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not, therefore, to be considered limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

Figure 1:
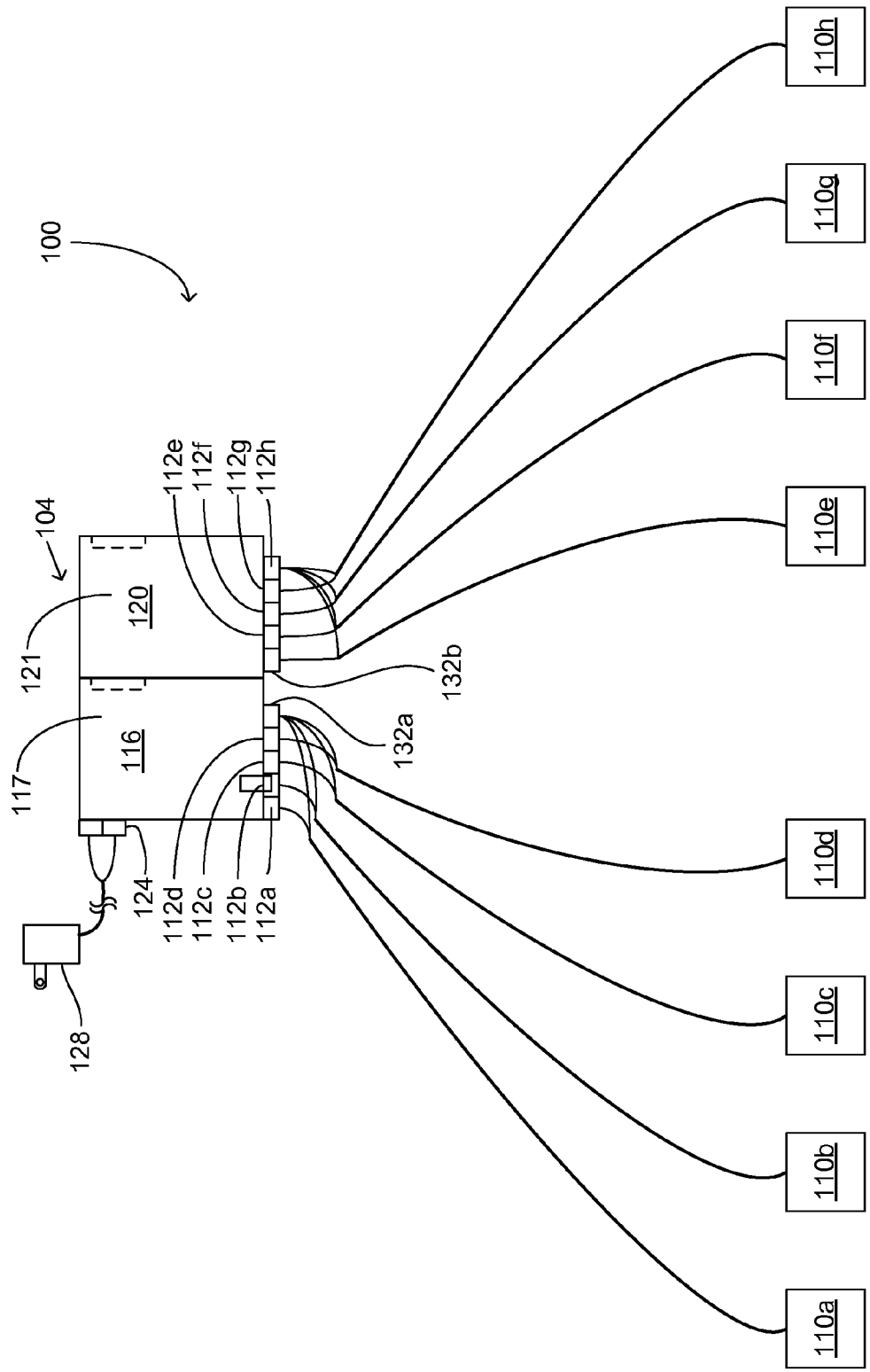
FIG. 1 illustrates one embodiment of a sprinkler system that utilizes one type of modular sprinkler controller.

FIG. 1 illustrates one embodiment of a sprinkler system 100. The illustrated sprinkler system 100 includes a modular sprinkler controller 104 and a number of valves (shown in FIG. 2) for controlling a particular sprinkler station 110a-h.

Figure 2:
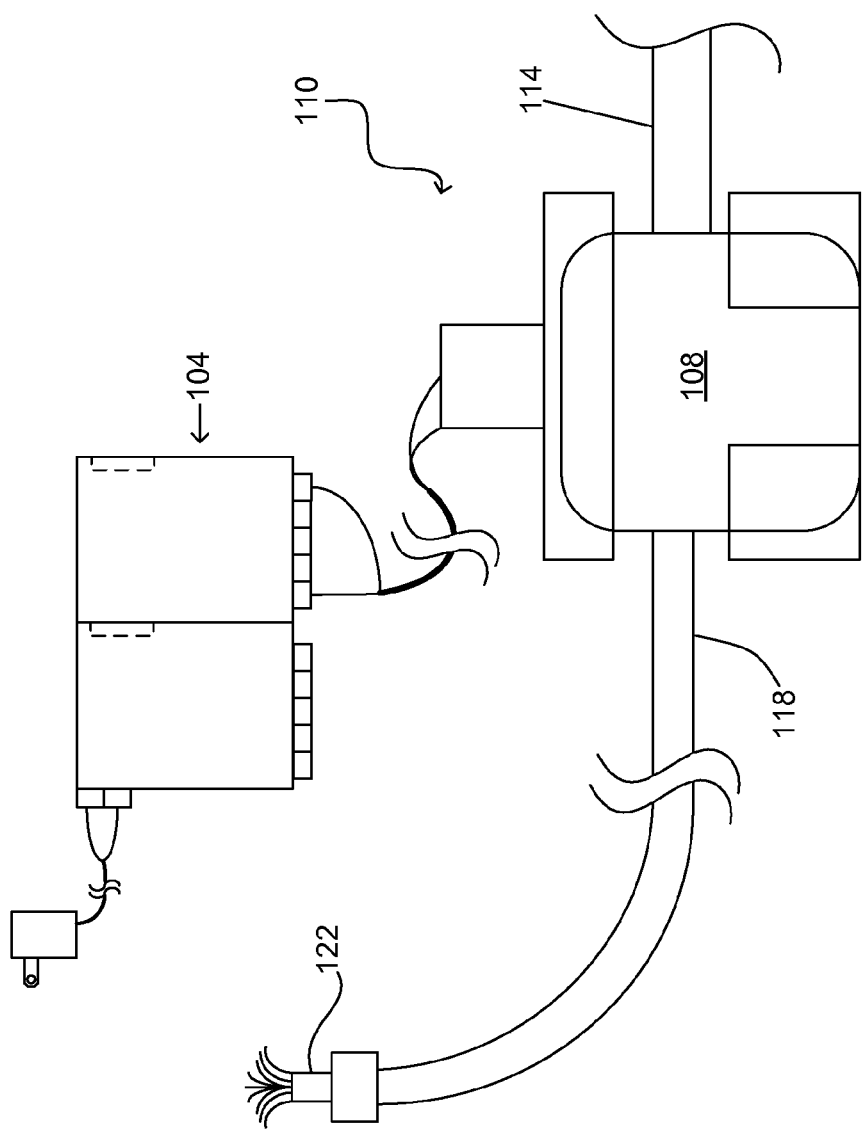
FIG. 2 illustrates one embodiment of a sprinkler station with an input and output pipe and a sprinkler device.

Each sprinkler station 110, as shown in FIG. 2, includes a valve 108 and one or more sprinkler devices 122 in fluid communication with the valve 108. An input pipe 114, allows water to enter the valve 108. When the modular sprinkler controller 104 communicates to the valve 108 instructions to open the value 108, the water or another fluid (such as the fertilizer-enriched water) can move from the input pipe 114 into and through the valve 108 and into an output pipe 118, and then be released through the sprinkler device 122. In this embodiment, the valve 108 is connected to only one sprinkler device 122. However, more than one sprinkler device 122 can be attached to the valve 108.

With reference once again to FIG. 1, for simplicity, the accompanying pipes of the sprinkler station 110a-h are not shown. The disclosed modular sprinkler controller 104 includes a base unit 116 and one add-on module 120. The base unit 116 includes electrical terminals 124, or another type of electrical connection, for securing the base unit 116 to an electrical plug for connection to a power source 128. Alternatively, the base unit 116 could be powered by, for example, a battery power source or a solar power source or combinations thereof, or even hard wired to a power source. In one embodiment, all functions are not available when battery power is being utilized.

The base unit 116 includes a number of valve terminals 112a-d for communication with the valves 108. In the illustrated embodiment, the base unit 116 includes four valve terminals 112a-d for sending a control signal to each of the valves 108 and a common valve terminal 132a to complete the circuit for communication with the valves 108. The illustrated valves 108 could be solenoid valves, or any other type of valve that enables control of a pressurized fluid. As indicated above, opening the valve 108 allows pressurized water, or another fluid, to flow to one or more sprinkler devices 122 of any type. As indicated above, the fluid does not necessarily need to be water, but may include, for example, water plus a fertilizer or a weed inhibitor. The illustrated base unit 116 may control up to four sprinkler valves 108, although other embodiments that control a different number of sprinkler valves 108 may be implemented within the scope of the disclosed subject matter.

The base unit 116 may include circuitry, memory, and input devices, such as buttons, or dials, for establishing a schedule for opening and closing the coupled valves 108. The base unit also may be in communication with, for example, one or more sensors (such as a rain, moisture, and/or temperature sensor) or remote control that may affect the watering schedule specified by the base unit 116. The foregoing features, for simplicity, are not illustrated, but are known and understood by those of skill in the industry.

As indicated above, the disclosed modular sprinkler controller 104 includes an add-on module 120. The add-on module 120 enables control of up to four additional sprinkler valves 108 through the base unit 116 through the illustrated valve terminals 112e-h, although other embodiments of add-on modules 120 that control a different number of sprinkler valves 108 may be implemented within the scope of the disclosed subject matter. The modular sprinkler controller 104 and base unit 116, may be embodied within a single housing (not shown) or, alternatively, may be embodied in separate housings, as shown in FIG. 1. In one embodiment, a separate housing 121 of an add-on module 120 covers internal components (such as micro-controller units (MCUs) 236a-c (shown in FIG. 3), Triac Groups 240a-c (shown in FIG. 3), terminals 112e-h, and/or common terminals 132b) of the add-on module 120 without the need to utilize a housing 117 of the base unit 116.

As noted, the add-on module 120 in the illustrated embodiment enables the control of up to four additional sprinkler valves 108. The add-on module 120 may also include a common valve terminal 132b. A common valve terminal 132b, however may be omitted in certain embodiments as the modules controlled by the add-on module 120, may utilize the common valve terminal 132a of the base unit 116.

As noted above, the embodiment of the sprinkler system 100, including the modular sprinkler controller 104, as shown in FIG. 1, is merely illustrative and may be built in a number of different ways. For example, the number of sprinkler valves 108 that may be controlled by either the base unit 116 or an add-on module 120 is only illustrative. The base unit 116 could, for example, control four sprinkler valves 108 and an add-on module 120 could control an additional six sprinkler valves 108. Also, as noted above, each add-on module 120 may include a common valve terminal 132b or the base unit 116 may include a single common valve terminal 132a.

Also, the position of the terminals 112a-h for controlling sprinkler valves 108 shown in FIG. 1 is merely illustrative. Those of skill in the art will recognize that the terminals 112 may be positioned at various locations on the base unit 116 and add-on modules 120 to enable access by a user.

Figure 3:
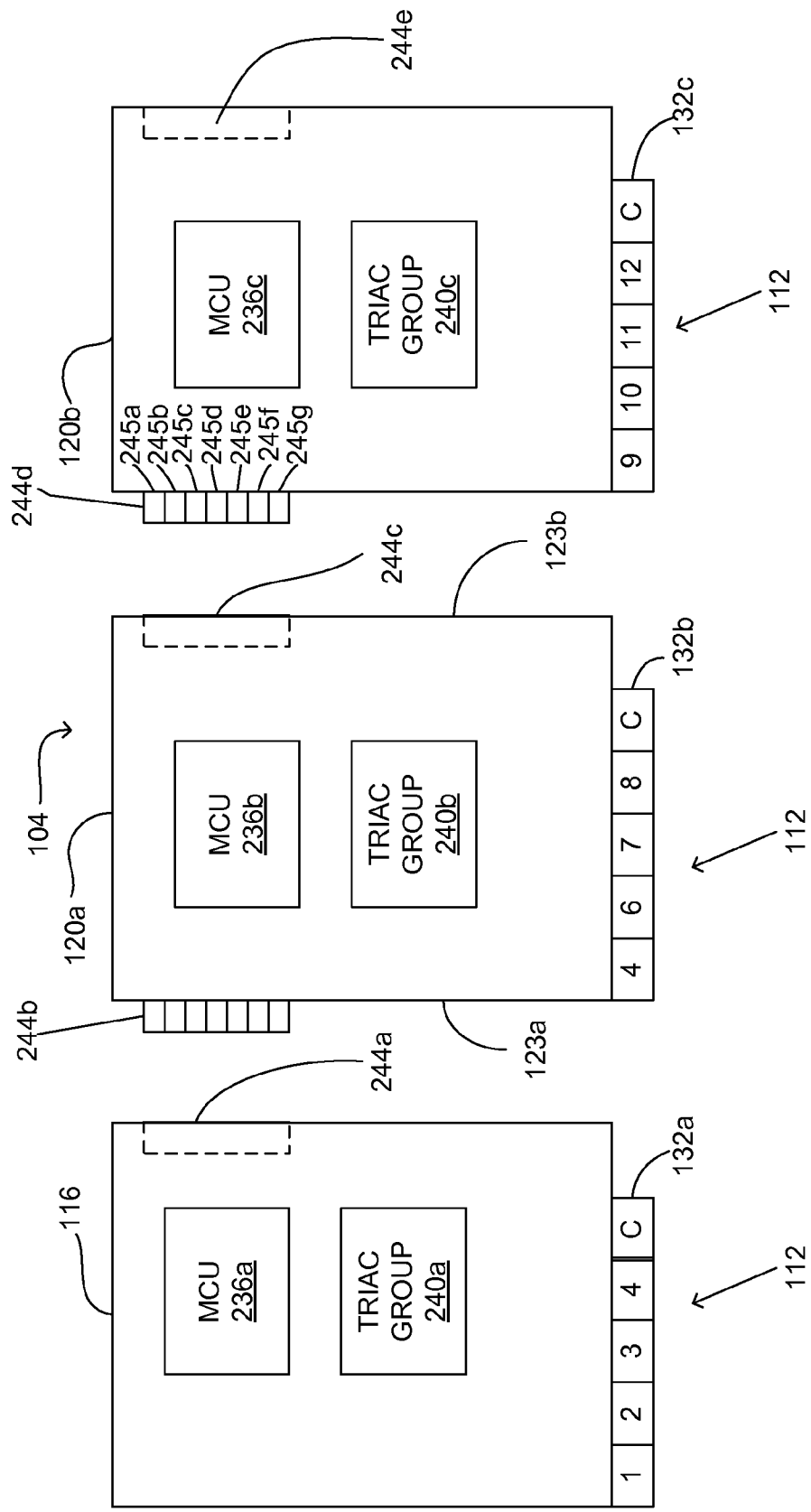
FIG. 3 illustrates one embodiment of a modular sprinkler controller that includes two add-on modules that have not been connected to the base unit.

FIG. 3 illustrates one embodiment of a modular sprinkler controller 104 that includes a base unit 116 and two add-on modules 120a-b. The base unit 116 and each of the add-on modules 120a-b include valve terminals 112 for connection of wires to control sprinkler valves 108 (shown in FIG. 2). As illustrated in FIG. 3, the base unit 116 and each of the add-on modules 120a-b include a common valve terminal 132a-c to complete the circuit with the valves. As noted above, the common valve terminal 132a could be positioned on the base unit 116 without any common valve terminals 132b-c on the add-on modules 120a-b or vice versa.

The base unit 116 and each of the add-on modules 120a-b include a microcontroller unit (MCU) 236a-c for processing input signals and output signals. Input signals could include, for example, data from a sensor, data from a remote control unit, or inputs received through button controls or dials on the base unit 116, which again, for simplicity, are not illustrated here. Output signals include signals sent to the valves 108 for turning on and off the valves 108, either directly or indirectly. Output signals could include commands transmitted to add-on modules 120a-b or to the base unit 116.

The base unit 116 and each add-on module 120a-b include a triac group 240a-c, or triac board, for controlling each of the sprinkler valves via a corresponding valve terminal 112. Of course, the use of a triac group 240a-c is merely illustrative, and other types of circuitry or mechanisms may be utilized for controlling coupled sprinkler valves.

The base unit 116 and each of the add-on modules 120a-b include one or more communication connection points 244a-e for communicating with add-on modules 120a-b, such as recessed and protruding communication connection points 244a-e, as shown in FIG. 3. Of course, other types of connection points 244a-e may be utilized, such as a hybrid connection point (not shown) that includes both recessed and protruding portions. In the illustrated embodiment, the base unit 116 includes only a single connection point 244a, and each add-on module 120a-b includes two connection points 244b-e.

These connection points 244a-e enable serial communication in its various iterations. For example, $I^2C$ (pronounced "I Squared C") may be utilized. The number of communication channels 245a-g included within each connection point 244a-e may be different in various embodiments, including, for example, embodiments with seven (as shown), six, five, four, three, or other numbers of communication channels 245a-g within each communication point 244a-e. An MCU 236a-c in the base unit 116 and add-on module 120a-b may be utilized to interpret signals received from either the base unit 116 or other add-on modules 120a-b.

As shown in FIG. 3, each base unit and add-on module include a separate housing. In an alternative embodiment, a single housing may be utilized to shield the base unit 116 and each add-on module 120a-b from the elements.

The modular sprinkler controller 104 shown in FIG. 3 may be embodied in various ways. For example, only a single add-on module 120a-b may be utilized or two or more add-on modules 120a-b can be employed. Again, the physical configuration of the add-on module 120a-b may be modified within the scope of the disclosed invention. Also, the number of the sprinkler valves 108 that may be controlled by the base unit 116 and add-on modules 120a-b may be modified. In one embodiment, for example, an add-on module 120a-b could control either four or six sprinkler valves, depending upon the add-on module 120a-b purchased by the end-user. In FIG. 3, the base unit 116 and the add-on modules 120a-b are shown in the separated or "unconnected" state. In one embodiment, an add-on module 120a may include two terminal communication points 244b-c positioned on opposing sides 123a-b of the add-on module 120a to receive and be connected to other add-on modules 120b and/or a base unit 116.

As illustrated in FIG. 3, a first add-on module 120a is connectable to the base unit 116 and a second add-on module 120b is connectable to the first add-on module 120a in a piggyback configuration for communication with the base unit 116 through the first add-on module 120a. Of course, a third and fourth add-on module (not illustrated) and additional add-on modules could also be connectable in a piggyback configuration to previously connected modules 120a-b.

Figure 4:
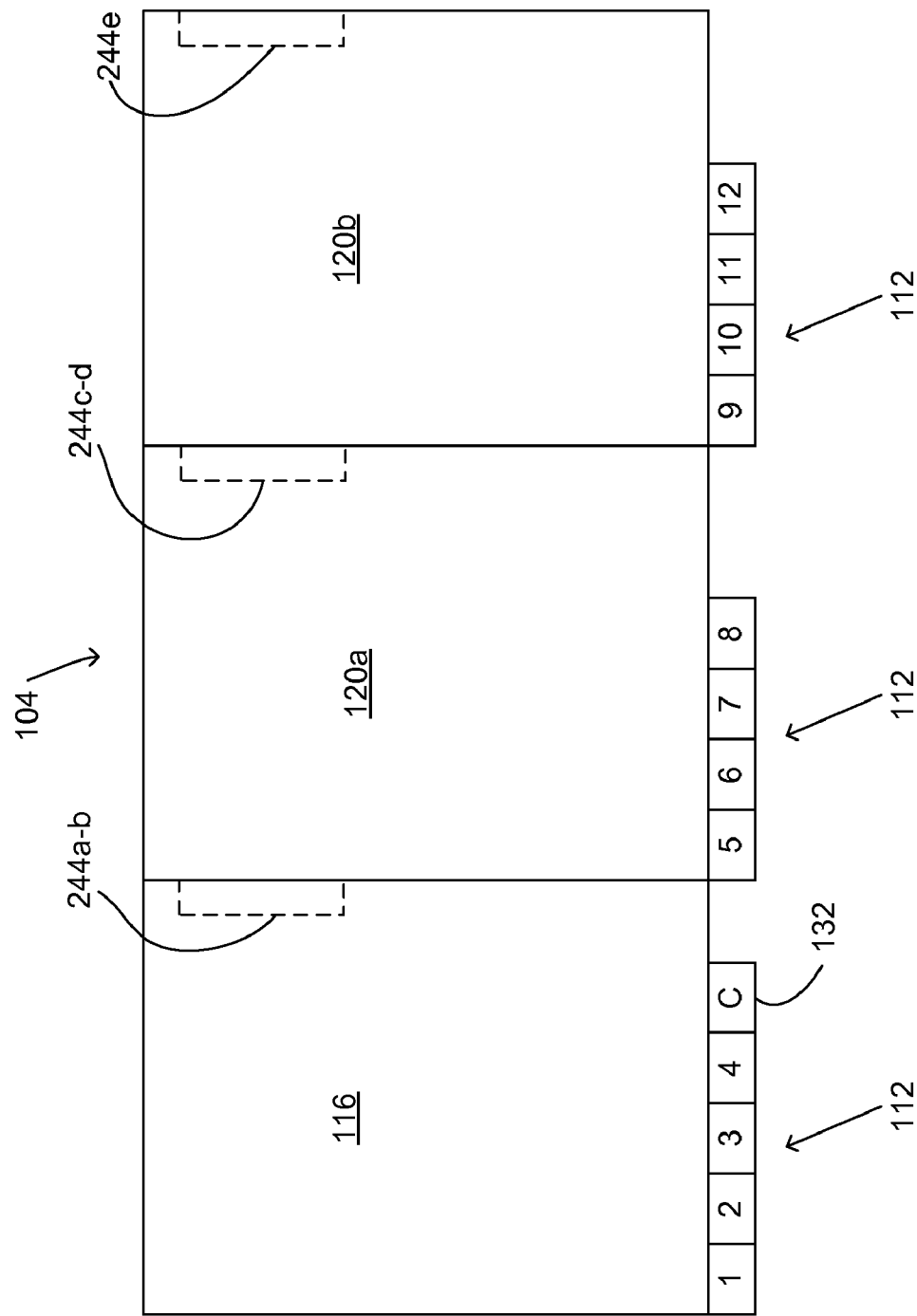
FIG. 4 illustrates an embodiment of a modular sprinkler controller in which two modules have been attached in a piggyback fashion to a base unit.

With reference to FIG. 4, a modular sprinkler controller 104 is shown. In this embodiment, the base unit 116 and two add-on modules 120a-b are shown in a coupled or connected state. As before, the base unit 116 and each add-on module 120a-b include valve terminals 112 for communicating with sprinkler valves 108 (shown in FIG. 2) and one or more communication connection points 244a-e that enable communication between each of the add-on modules 120a-b and the base unit 116. As shown, each of the mating connection points 244a-d are secured together to enable electrical communication between the base unit 116 and the first add-on module 120a as well as from each subsequent add-on module 120b through the previous module or modules 120a, and back to the base unit 116. As shown, the base unit 116 and add-on modules 120a-b are arranged and connected in a piggyback configuration such that each add-on module 120a-b is positioned adjacent to either a base unit 116 or another add-on module 120a-b.

Of course, the types of connection points 244a-e on the base unit 116 and add-on modules 120a-b may be varied within the scope of the disclosed invention. For example, a protruding connection point 244b, 244d may be positioned on an add-on module 120a-b, and a mating recessed connection point 244a, 244c, 244e may be positioned on the base unit 116 or another module 120a-b, as shown in FIGS. 3-4. Also, latches for securing the base unit 116 to an add-on module 120a-b or for securing two add-on modules 120a-b together may also be utilized, although these are not illustrated in FIG. 4.

It should also be noted here that a single common valve terminal 132 is found on the base unit 116 of FIG. 4 for completing a circuit with each of the sprinkler valves 108, including those found on the add-on modules 120a-b. As indicated above, each add-on module 120a-b may include one or a plurality of common valve terminals 132b-c (shown in FIG. 3).

The present invention provides significant advantages in that, for example, it is simple for an end-user to add an add-on module 120a-b to the base unit 116. Assembly is intuitive and the user is not required to remove the housing of the base unit or work with small intricate parts and complex assembly procedures.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A sprinkler controller module, comprising:
a base unit having a housing, a microcontroller unit ("MCU"), and a triac group in electrical communication with valve terminals that enable control of coupled sprinkler valves, and only a single communication connection point for receiving an add-on module; and
at least one add-on module, each add-on module including a housing that is separate from the housing of the base unit, an MCU that receives and interprets signals from the base unit, and a triac group in electrical communication with valve terminals for each add-on module that enable control of coupled sprinkler valves, and two communication connection points for communication with an adjacent add-on module or the base unit, the two communication connection points being positioned on opposing sides of each add-on module, wherein a first add-on module is connectable to the base unit and a second add-on module is connectable to the first add-on module in a piggyback configuration, wherein if the first add-on module is connected to the base unit, at least half of a side of the housing of the base unit physically abuts at least half of a side of the housing of the first add-on module.

2. The sprinkler controller of claim 1, wherein the base unit and each add-on module communicate utilizing a serial communication protocol.

3. The sprinkler controller of claim 1, wherein the base unit and each add-on module communicate utilizing I²C communication protocol.

4. A sprinkler controller module, comprising:
a base unit having a housing, a microcontroller unit ("MCU"), and a triac group in electrical communication with valve terminals that enable control of coupled sprinkler valves, and only a single communication connection point for receiving an add-on module; and
the add-on module including a housing that is separate from the housing of the base unit, an MCU that receives and interprets signals from the base unit, a triac group in electrical communication with valve terminals for the add-on module that enable control of coupled sprinkler valves, and two communication connection points for communication with an adjacent add-on module or the base unit, the connection points being positioned on opposing sides of the add-on module, wherein the add-on module is connectable to the base unit, wherein if the add-on module is connected to the base unit, at least half of a side of the housing of the base unit physically abuts at least half of a side of the housing of the add-on module.

5. The sprinkler controller of claim 4, wherein the base unit and the add-on module communicate utilizing a serial communication protocol.

6. The sprinkler controller of claim 4, wherein the base unit and the add-on module communicate utilizing I²C communication protocol.

7. A sprinkler controller add-on module for connecting to a base unit, the base unit having a housing, a microcontroller unit ("MCU"), and a triac group in electrical communication with valve terminals that enable control of coupled sprinkler valves, and a communication connection point for receiving the add-on module, the add-on module comprising:

a housing that is separate from the housing of the base unit;

an MCU that receives and interprets signals from the base unit;

a triac group in electrical communication with valve terminals that enable control of coupled sprinkler valves, and two communication connection points for communication with an adjacent add-on module or the base unit, the connection points being positioned on opposing sides of the add-on module, wherein if the add-on module is connected to the base unit, at least half of a side of the housing of the base unit physically abuts at least half of a side of the housing of the add-on module.

* * * * *